Feb. 7, 1956  A. L. THURSTON  2,733,911
WEIGHING DEVICE

Filed May 24, 1952  4 Sheets-Sheet 1

Fig. 1.

INVENTOR.
ARTHUR L. THURSTON.
BY Ward, Crosby & Neal
his ATTORNEYS.

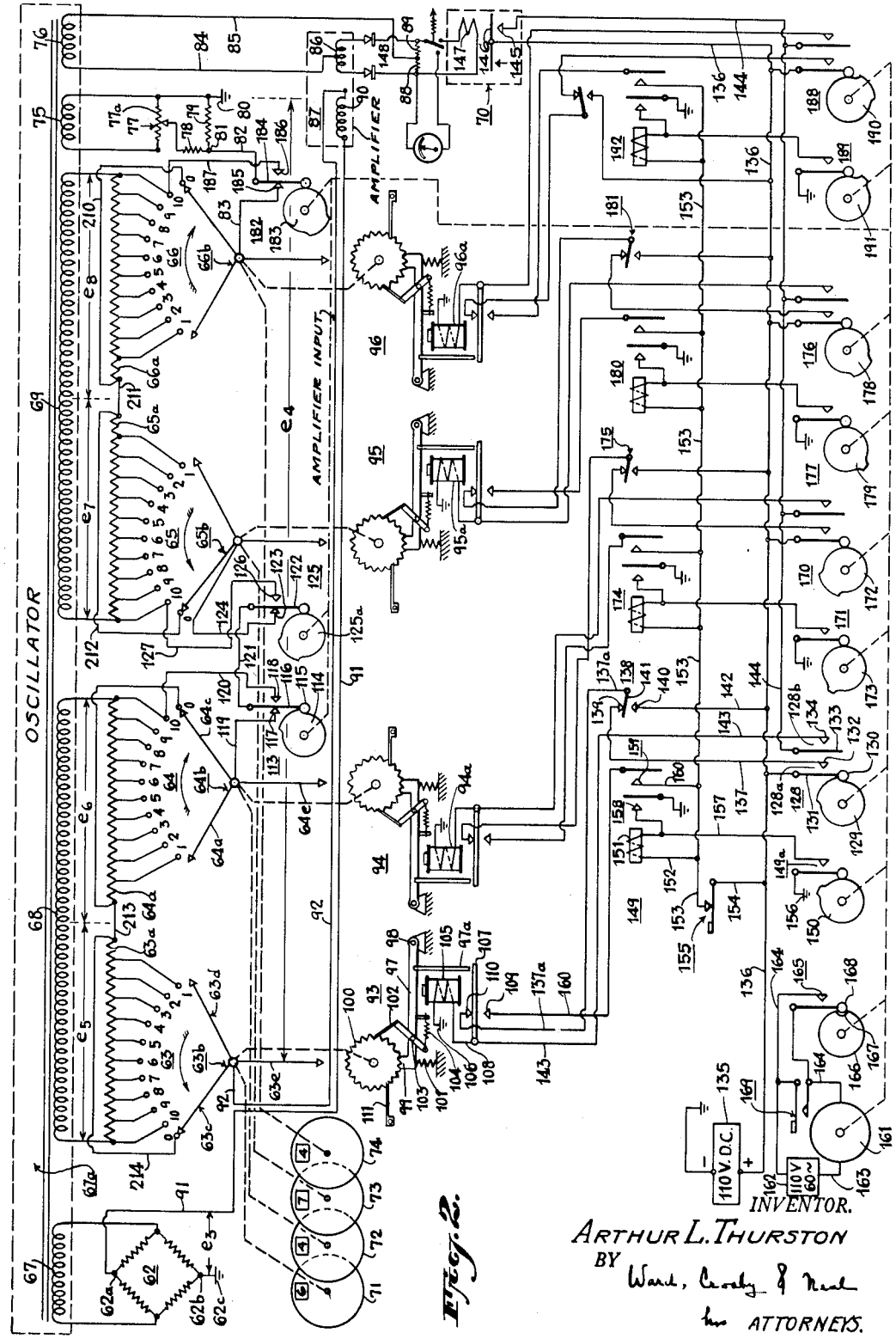

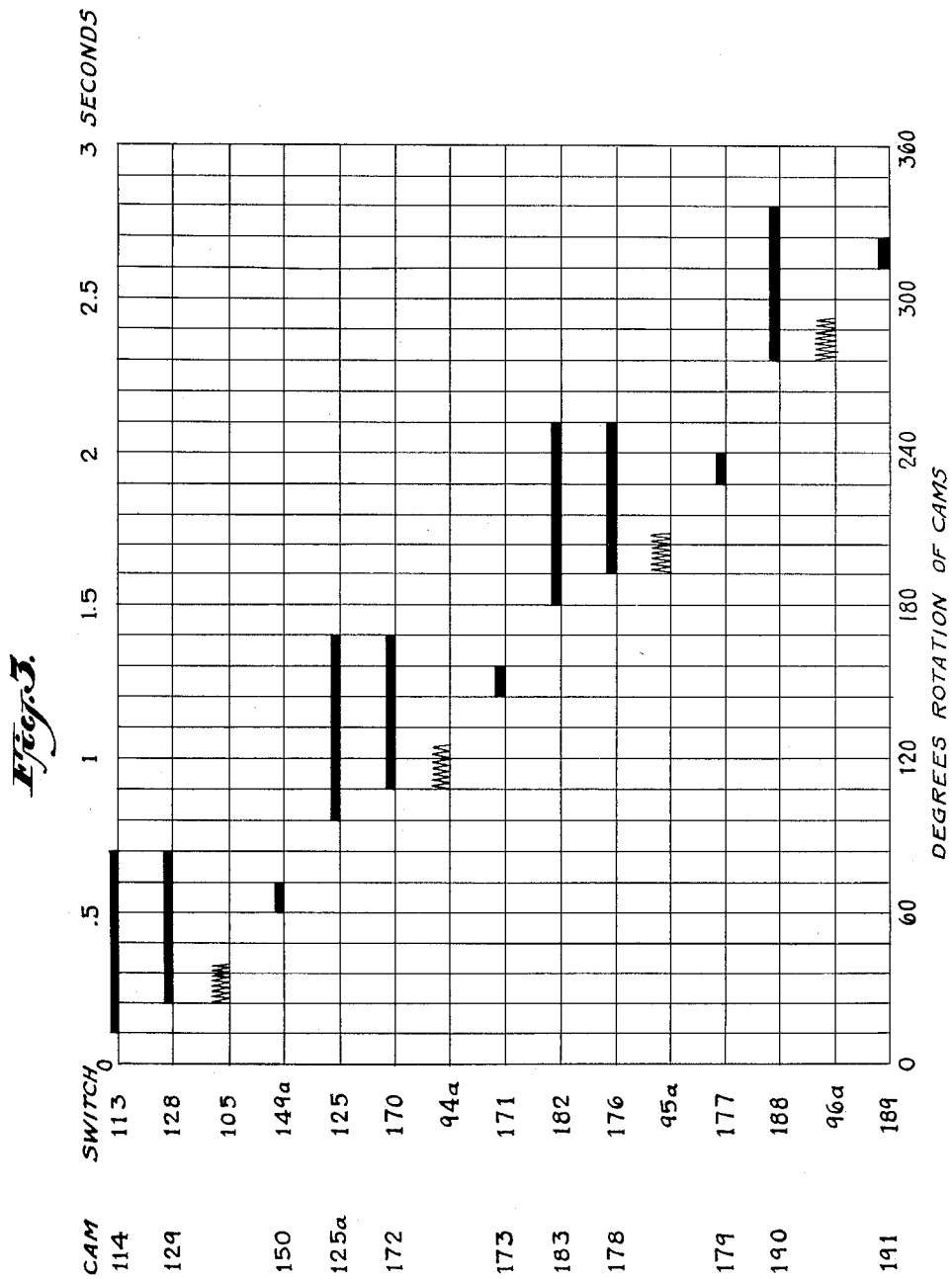

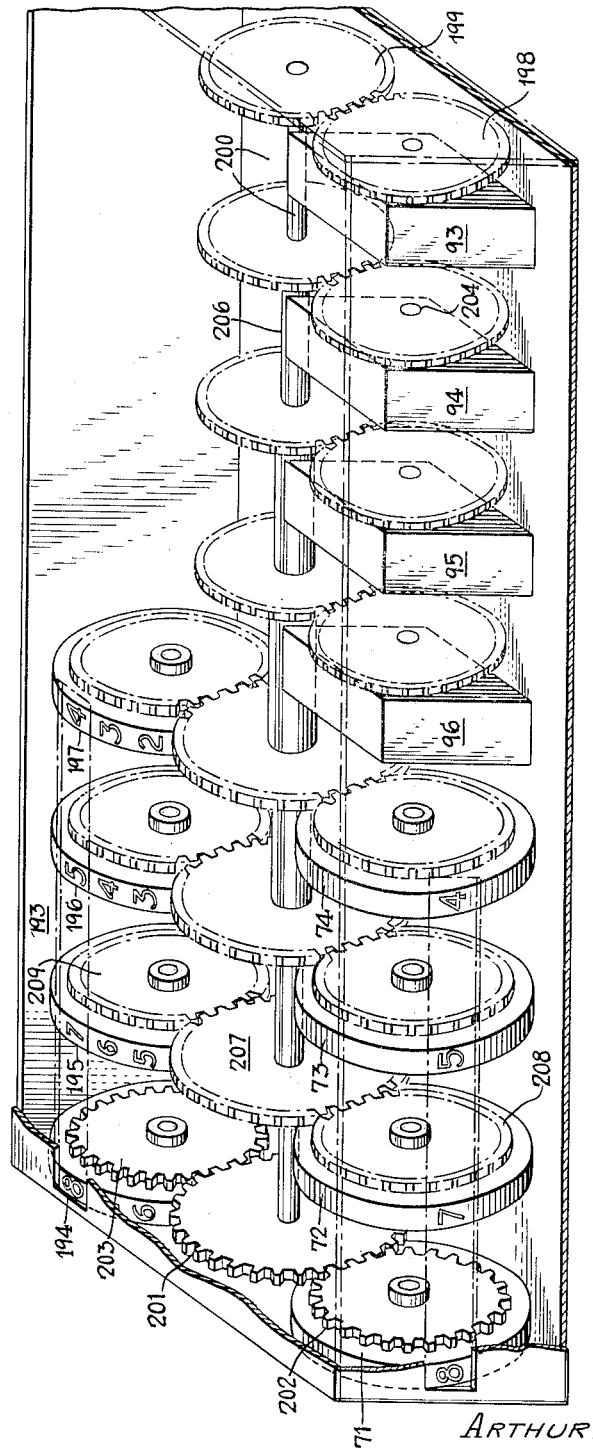

United States Patent Office 2,733,911
Patented Feb. 7, 1956

2,733,911

WEIGHING DEVICE

Arthur L. Thurston, Wantagh, N. Y., assignor, by mesne assignments, to Revere Corporation of America, a corporation of New Jersey Application May 24, 1952, Serial No. 289,839

13 Claims. (Cl. 265—27)

This invention relates to weighing apparatus, and more particularly to electrical weighing apparatus for providing a quick indication of weight within wide limits thereof.

Apparatus of this general character suggested in the past for measuring, for example, the weight of moving objects such as railroad cars which move over a weighing scale platform, have been highly complicated and expensive not only to construct but also to maintain.

Furthermore, in apparatus of this character suggested in the past for providing a clear visual indication of such weight and for providing suitable means for presenting such indication in printable form, again highly complicated and expensive apparatus have been required, particularly where there has existed the necessity for careful digital alignment.

One of the objects of the present invention is to overcome the above disadvantages or to reduce them to insignificance.

The invention, in one aspect thereof, is constituted by: means including an electrical circuit for controlling in response to such weight an electrical parameter (e. g. voltage), such means including an electro-responsive element, for example, strain gauge weighing cell means as disclosed in my United States Patent No. 2,488,349. The electrical energy output of such electrical parameter control means is measured by comparing it with a counter-parameter or counter-energy controlled by the following novel means, the actuation of which moves indicia means connected thereto and provides a measure of the first mentioned parameter: a plurality of electrical incremental means, such as stepped potentiometers, are employed, each designed for varying in preselected increments a supply of electrical energy, such as voltage. Each incremental means has weight indicia means, graduated in corresponding steps or increments, operatively connected thereto. The plurality of incremental means are arranged in succession, the increment of each one of such means (including the increment of its indicia means) being of a larger order than that of the incremental means next lower in succession. Said incremental means are actuated sequentially to produce, in the aggregate, energy equal and opposite to that of the parameter control means. Suitable energy comparator means are provided for comparing the energy output of said parameter control means with that of the plurality of such incremental means. Such comparison is effected automatically by a system of automatically operable actuating devices for stepping or advancing the plurality of incremental means one at a time in succession commencing with the one having the increment of largest order. Such system employs in such actuating device a like plurality of, for example, stepping switches for so advancing respective of said incremental means. In order to insure that a given incremental means will stop at and not overstep its proper position of advancement, each such actuating device (e. g. stepping switch) of such given incremental means (except the last one in succession) is controlled in accordance with a comparison in said comparator of: (a) the energy output of said parameter control means, with (b) the sum of the energy output of said given incremental means plus an added amount of electrical energy supplied to the latter means and corresponding to the maximum energy output (or a preselected percentage thereof) of the next lower successive incremental means. When such comparator means senses a preselected relationship between such outputs, suitable means arrest at the correct position: the particular actuating device, its incremental and indicia means.

The above and further objects and novel features of the invention will more fully appear from the following detailed description when the same is read in connection with the accompanying drawings. It is to be expressly understood, however, that the drawings are for purposes of illustration only and are not intended as a definition of the limits of the invention, reference for this latter purpose being had primarily to the appended claims.

In the drawings:

Fig. 1 is a schematic diagram of one embodiment of the present invention;

Fig. 2 is a schematic diagram of a second embodiment of the invention;

Fig. 3 is a graphical representative of the sequence of operation of certain of the elements of the embodiment shown in Fig. 2; and Fig. 4 is a perspective view indicating one form of the mechanical interconnection between one group of elements of the invention and another group thereof.

Referring to Fig. 1, one form of the invention is shown which is designed for measuring weight. Means are employed for controlling electrical energy (or any electrical parameter) in accordance with the weight of an object through the intermediary of, for example, force or weight sensitive cell means which support the weight. The latter cell means comprises an electro-responsive element and is provided with force or stress receiving column means (not shown), the latter carrying electrical resistance type strain gauge means bonded thereto. The aforementioned weight sensitive cell means are generally indicated at 10 in Fig. 1 and the resistance type strain gauge means are shown at 11, 12 and 13, 14. The latter are connected in the form of a bridge circuit with the resistances 11 and 12 comprising the active gauges and 13 and 14 dummy or inactive ones. Such strain gauge means are connected in an electrical circuit, the output of which is responsive to the change in electrical characteristics of the gauges 11 and 12, that is, a force or weight signal is produced responsive to the stress upon the aforementioned stress receiving column means. The operation and construction of the aforementioned resistance type strain gauge means can be similar, for example, to that set forth in my aforementioned United States Patent No. 2,488,349.

A source of alternating electrical energy, as at 15, is employed comprising a part of an oscillator 16. The latter, for example, is provided with a transformer 16a having a plurality of secondary or output windings as at 17, 18, 19, 20 and 21. The output winding 17 is connected to opposite terminals 22 and 23 of the bridge circuit of said resistances 11–14. Conjugate points 24 and 25 of said bridge circuit are respectively connected to: (a) one terminal 26 of an input winding 27 of an amplifier 28, and (b) to ground at 29.

The strain gauge resistances 11–14 inclusive, are all equal so that the bridge is balanced when there is no load upon the cell. At this time a voltage $e_1$ is zero between the conjugate points or output terminals 24, 25 of the bridge. Suitable means (not shown) may be provided to balance the bridge when there is no load thereupon, such balancing being necessary, for example, to compensate for so-called "manufacturing tolerances" of the strain gauge resistances. A load applied to the weight sensitive cell means 10 will change the resistances of the active strain gauges 11 and 12 and thereby unbalance the bridge circuit of the weighing cell and create said voltage $e_1$ between the terminals 24 and 25 proportional to the load upon the cell.

The aforementioned output voltage $e_1$ of the bridge circuit is measured by comparing same with a countervoltage $e_2$ which is controlled by the following novel means: A first plurality of manually variable potentiometers, for example, two in number indicated at 30 and 31, are employed which are respectively provided with stepped or tapped resistances 32 and 33. Such potentiometers are generally referred to as electrical incremental means which term embraces electrical means which are designed for varying electrical energy in preselected steps or increments. The resistances 32 and 33 are connected in series across the secondary winding 18.

A second plurality of such incremental means is shown at 34 and 35 comprising a pair of stepped potentiometers similar to 30 and 31. The latter pair of potentiometers are provided with stepped or tapped resistances 36 and 37 which in turn are connected in series across the secondary winding 19.

The stepped potentiometers 30, 31, 34 and 35 are each designed for varying voltage in accordance with a preselected increment. Said potentiometers are arranged in successive order, the first one having a voltage increment which is of a higher order than the next lower one and so on. That is, the potentiometers 30, 31, 34 and 35 are designed for changing a voltage in increments of, for example, 1000, 100, 10, and 1 units respectively.

Assume for purposes of illustration that the weighing cell 10 has a maximum capacity of 10,000 pounds and that an output voltage $e_1$ of one volt is produced by each pound of weight. Thus the resistor 32 should be provided with 9 separate taps, each separated by an increment of 1,000 volts. That is, the taps of resistance 32 are positioned to provide increments of voltage equivalent to the voltage output of the cell for weights of zero pounds, 1,000, 2,000, 3,000 and so forth, up to and including 9,000 pounds. The taps of the resistor 33 are positioned to provide such increments of voltage corresponding to weights of zero–100–200 and so forth, up to and including 900. The taps of resistance 36 in turn are analogously positioned to provide such increments of voltage corresponding to weights of zero–10–20 and so forth, up to and including 90, and lastly the taps of resistance 37 are positioned to provide such increments of voltage corresponding to weights of zero–1–2–3 and so forth, up to and including 10.

I have found it desirable to interconnect the potentiometer arms 30a, 31a, 34a and 35a and their respective potentiometers as follows: In general said arms are connected in series through the pertinent portions of their respective resistances. Arm 30a is connected by means of a lead 38 to terminal 39 of the amplifier input coil 27. The arms 31a and 34a are connected to one another by a lead 40, and the arm 35a is connected to ground, as at 41, by means of a lead 42 in which is interposed an attenuator, indicated generally at 43 and consisting of resistances 44 and 45. The former resistance is connected to a variable resistance 46 which in turn is connected across the aforementioned secondary coil 20. Thus the voltage from the oscillator winding 20 is applied to variable resistance 46 which serves the function of an adjustable potentiometer, and a portion of said voltage across resistance 46 is applied across said attenuator 43 to provide for zero or tare adjustment. The latter resistance is directly interposed in lead 42 in series therewith.

The aforedescribed plurality of incremental means are arranged and connected for controlling a counter E. M. F. (or counterparameter) $e_2$ (Fig. 1) which, in the form shown, is in phase opposition to $e_1$ and is compared with the latter in suitable sensing and indicating means (also referred to as comparator means) which, in the form shown, comprise: the amplifier 28 having an output coil 47 which in turn is connected to a phase sensitive balanced rectifier 48 at terminals 49 and 50; secondary winding 21 connected to the mid-point of winding 47 and to the junction of resistances 51 and 52 which in turn are connected across the aforementioned balanced rectifier 48 (thus the circuit is sensitive to phase and amplitude); and a suitable D. C. "zero center meter" as at 53, connected by means of leads 54 and 55 to the output terminals as at 56 and 57 of the balanced rectifier 48.

In operation, it is evident that the incremental means 30, 31 and 34, 35 collectively constitute a potentiometer, the output voltage of which ($e_2$), as measured between arms 30a and attenuator 43, is proportional to the adjustments of the arms 30a, 31a, 34a and 35a. Before an object to be weighed is placed upon the weighing cell means 10, the operator adjusts all of the aforementioned potentiometer arms to their zero settings, the position shown in Fig. 1, and the potentiometer 46 is adjusted until the meter 53 indicates zero. If the object to be weighed is assumed to weigh, for example, 6,474 pounds, and is placed upon the cell means 10, the pointer of said meter 53 just prior thereto having read zero (or center), the pointer will shift angularly, for example, to the left, indicating that $e_1$ is greater than $e_2$. The operator thereafter angularly shifts the arm 30a until such pointer of meter 53 swings to the right, which will be precisely at the tap corresponding to 7,000 pounds or volts. Thereupon the operator turns the arm 30a back in an opposite direction to the extent of one tap, thereupon applying a voltage $e_2$ to the amplifier corresponding to the 6,000 pounds. The operator thereupon angularly shifts the arm 31a until the meter again swings to the right thereby indicating that a voltage corresponding to an aggregate of 6,500 pounds has been reached upon the two potentiometers 30 and 31. Arm 31a then is shifted back in an opposite direction to the extent of one tap. The same procedure is repeated with respect to potentiometer 34 until a voltage of 6,470 pounds is reached. Finally, the operator adjusts the potentiometer arm 35a until the meter 16 actually balances in the center thereof which will occur when the aggregate voltage supplied by all the potentiometers corresponds to the aforementioned weight of 6,474 pounds.

Suitable indicia means are operatively connected to each of the aforementioned potentiometers (30, 31 and 34, 35) preferably comprising a separate indicator or dial for each of the arms of said potentiometers. Arm 30a is, in the form shown, operatively connected to a dial 58 and the next successive potentiometer arms respectively to dials 59, 60 and 61. Said indicia means or dials are suitably graduated, each one to indicate, for example, one significant figure of the weight and, if desired, a suitable masking or window device is provided through which only one of such significant figures of each of the dials may be viewed at one time.

Referring now to Fig. 2, there is shown an embodiment wherein means are provided for automatically adjusting the stepped potentiometers, the latter analogous to those described in connection with Fig. 1, and such adjustment being effected extremely rapidly, for example, within less than three seconds.

In this embodiment, a weighing cell 62 is employed which is analogous to the weighing cell 10 shown in Fig. 1. It is, of course, understood that the weighing cell 62 controls a voltage $e_3$ which is analogous to voltage $e_1$ of such embodiment of Fig. 1. Four stepped or tapped potentiometers 63, 64, 65 and 66 are provided which also are generally analogous to the aforedescribed stepped potentiometers of the embodiment of Fig. 1, such potentiometers 63 to 66 having tapped resistors 63a to 66a, inclusive, respectively. The weighing cell 62 is electrically connected to a secondary coil 67 of a transformer 67a, the resistors of stepped potentiometers 63 and 64 are connected to a secondary coil 68, and the resistors of potentiometers 65 and 66 are connected to a secondary coil 69 in a manner analogous to the respective counterparts therefor shown in Fig. 1. As will appear more fully hereinafter, the tapped resistances 63a and 64a are connected in series with one another and across the terminals of the secondary coil 68, and the resistances 65a and 66a in turn are connected in series across the secondary coil 69.

The aforementioned stepped potentiometers 63–66, inclusive, are provided with angularly shiftable wipers 63b, 64b, 65b and 66b, respectively, which, as will appear hereinafter to expedite "homing," are provided each with three separate arms separated by 120°. Only one of such arms at a time can engage a tap. Said wipers are electrically connected together whereby a voltage $e_4$ is controlled by said potentiometers which is analogous to the aforedescribed voltage $e_2$. In the embodiment of Fig. 2 it is seen that the stepped potentiometer voltage $e_4$ is equal to the sum of voltages of each of said individual potentiometers by virtue of the series connection of the wipers through the pertinent portions of their resistors.

The embodiment of Fig. 2, instead of employing a zero center meter 53, employs a quick-acting sensitive relay, indicated generally at 70, which is an element of the comparing means for sensing the relationship between $e_3$ and $e_4$ as will appear more fully hereinafter.

The potentiometer arms 63b–66b, inclusive, are respectively operatively connected to indicia means, such as 71–74, inclusive, in a manner which may be analogous to that shown in the embodiment of Fig. 1. The relationship between said potentiometer arms, the aforementioned indicia means 71–74, inclusive, and also certain embossed type wheels will be described hereinafter in connection with Fig. 4.

In order to simplify the explanation of the embodiment of Fig. 2, we will assume that in the output of the weighing cell 62, that is in the voltage $e_3$, one volt corresponds to a weight of one pound. Hence in the potentiometer output $e_4$, one volt also corresponds to one pound. In actual practice, however, this relationship does not normally exist, the ratio being, for example, about .10 microvolt for one pound of weight. Where the weighing device is to show four significant figures in the manner described above in connection with Fig. 1, I have found it desirable, with respect to the embodiment of Fig. 2, to tap the potentiometer resistances to produce voltages as follows:

Resistance 63a (total $e_5$) 9,000 volts in nine steps of 1,000 units each;

Resistance 64a (total $e_6$) 1,000 volts in ten steps of 100 units each;

Resistance 65a (total $e_7$) 100 volts in ten steps of 10 units each; and

Resistance 66a (total $e_8$) 10 volts in ten steps of 1 unit each, excepting steps 0 to 1 and 9 to 10 which are respectively .5 and 1.5 units for reasons to be explained later.

It is, of course, understood that there is one tap or contact provided for each step above mentioned.

Secondary coils 75 and 76 are provided in the embodiment of Fig. 2 analogous to coils 20 and 21 of Fig. 1 and coils 75 and 76 are connected in an analogous manner, that is, coil 75 is connected to a zero or tare adjustment potentiometer 77. A portion of the voltage across the resistance 77a is applied across an attenuator consisting, for example, of the resistances 78 and 79. Said attenuator is grounded, as at 80, and is connected from the terminal 81 thereof to the wiper 66b of the potentiometer 66 by means of leads 82 and 83, the extremities of which are interconnected through the intermediary of a cam controlled switch to be described more fully hereinafter.

The secondary coil 76, by means of leads 84 and 85, is connected respectively to the mid-point of an output coil 86 of amplifier 87, lead 85 being connected to the junction of resistances 88 and 89 thereby rendering phase sensitive a balanced rectifier (148) to be described hereinafter. Elements 87, 88 and 89 of Fig. 2 are analogous to elements 48, 51 and 52 respectively of Fig. 1.

The amplifier 87, of course, is provided with an input winding 90, the extremities of which are respectively connected to a terminal 62a of the weighing cell 62 by means of a lead 91, and to the wiper 63b by a lead 92. A corner 62b of the bridge 62 opposite to corner 62a is grounded, as at 62c.

The aforementioned relay 70, as above mentioned, constitutes an element of suitable energy comparator means for comparing the energy output of the parameter control means (weighing cell 62) with that of the plurality of incremental means (stepped potentiometers 63–66, inclusive). Such comparison is accomplished automatically by a system of automatically operable actuating devices for stepping or advancing the plurality of stepped potentiometers in succession commencing with the potentiometer having the increment of largest order. Each wiper of a potentiometer reaches its destination tap before the next successive wiper is moved from its home position. Such system comprises, for example, a plurality of stepping means 93, 94, 95 and 96. Each of such stepping means considered with its respective tapped resistance constitutes thus a stepping switch which is well known in the art. The stepping means 93–96 inclusive, are, of course, associated with said potentiometers 63–66, inclusive, respectively.

The stepping means 93 is provided with an armature 97 pivotally mounted at 98 and having a finger portion 99 at the opposite extremity thereof designed to engage and hold a ratchet wheel 100. The armature 97 is urged toward the ratchet wheel 100 by means of a driving spring 101. A pawl 102 which is pivotally mounted upon the armature 97 at 103 and is positioned for angularly shifting the ratchet wheel 100 when the armature is drawn away from such wheel and thereafter released. This is accomplished by virtue of the yielding engagement of the pawl 102 upon the wheel produced by a spring 104 which urges the pawl in a counter-clockwise direction, as viewed in Fig. 2. The armature 97 can be withdrawn or angularly shifted away from the ratchet wheel by means of a motor-magnet 105, one extremity of the coil of which is grounded, as at 106, the opposite extremity of such coil being connected to an interrupter arm 107 by means of a lead 108. The interrupter arm 107 is in the form of a leaf spring and is angularly shiftable between a pair of contacts 109 and 110 but is mounted such that it normally resiliently engages contact 110. But arm 107 can be thrust away from contact 110 into engagement with contact 109 by a finger 97a (secured to armature 97) in response to energization of motor-magnet 105 which in turn will move armature 97 downwardly. Said contacts 109 and 110 are connected in such a way that the motor-magnet 105 will be alternately energized and de-energized thereby to advance the ratchet wheel 100 and thus to step the wiper 63b, it being understood that the ratchet wheel 100 is operatively connected to the arm 63b. A suitable detent, as at 111, is employed for preventing the ratchet wheel from reversing its motion.

It is understood that the remaining stepping means 94—96, inclusive, are similarly constructed having motor-magnets 94a, 95a and 96a, respectively, and, of course, are each operatively connected with its respective potentiometer wiper. Also each of the stepping means 94–96, inclusive, are electrically connected into the electrical circuit shown in Fig. 2 in a manner analogous to that of stepping means 93 which will now be described.

We will assume, in the embodiment of Fig. 2, that it is again desired to weigh a load of 6474 pounds. Consequently, the wiper 63b should stop upon step or tap No. 6. The stepping switches are capable of stepping in one direction only and cannot reverse. Consequently the sixth tap would provide an inadequate amount of energy to balance against $e_3$, that is, such tap would provide an $e_4$ of 6,000 volts as against 6,474 emanating from the weighing cell 62. The relay 70, by virtue of the connection thereof into the circuit, is sensitive to both phase and amplitude of the voltages $e_3$ and $e_4$ and is connected for arresting the stepping or advancement of the stepping means, for example, 93, whenever $e_4$ becomes larger than $e_3$. Consequently it is desirable to supplement whatever voltage is provided by potentiometer 63 with an additional amount, for example, the full voltage provided by the potentiometer 64 (or a voltage equal thereto), thereby insuring that the arm 63 will be arrested upon the proper tap or step No. "6." The reason for this is that the aggregate voltage of potentiometers 63 and 64 will, of course, come to 7,000 volts when the wiper 63b has reached the step No. 6. As will appear hereinafter, a lesser amount than such full voltage of the next lower incremental means can be employed for supplementing the voltage of a given incremental means during the actuation of the latter.

The means for so supplying the voltage of the potentiometer 64 to the voltage of the potentiometer 63 constitute a cam controlled double contact switch device indicated generally at 113 comprising a cam 114 and a follower 115, the arm 116 of which constitues a switch arm which is angularly shiftable to engage one of a pair of contacts 117 or 118. Normally the switch arm 116 is urged against the contact 117. The latter, by means of a lead 119, is connected to the wiper 64b, and the former contact, by means of a lead 120, is connected to step or tap No. 10 of potentiometer 64. The switch arm 116 is, by means of a lead 121, a switch arm 122, contact 123 and a further lead 124, connected to the wiper 65b. Thus the cam control switch 113 is interposed in the interconnection between the wipers 64b and 65b whereby a shifting of said switch 113 from the left position, as shown in Fig. 2, in engagement with contact 117, to the opposite or right position in engagement with the contact 118, will apply the full voltage of the potentiometer 64 into the circuit of said potentiometers.

Thus means are provided for so supplying the added electrical energy to supplement that of potentiometer 63 at the outset of the operation of the latter.

The aforementioned switch arm 122 having a contact 123 comprises a portion of a cam controlled switch indicated generally at 125 having a cam 125a, this switch being similar to 113 and having a second contact 126 which is opposite to contact 123 and which, by means of a lead 127, is connected to step No. 10 of potentiometer 65. The cam controlled switch 125 is so connected for applying the full amount of the energy ($e_7$) to the potentiometer circuit during the advancement or stepping of the wiper 64b as will appear more fully hereinafter.

Following the supplying of the temporary and auxiliary energy $e_6$ into the potentiometer circuit, in order to insure that wiper 63b will advance and stop at the proper step, it is, of course, necessary to actuate the stepping means 93. This is accomplished by means of a cam controlled switch indicated generally at 128 and includes a cam 129 and a follower 130, the latter being secured to an angularly shiftable arm 131. The latter arm is positioned for engaging a contact 132 and, upon the engaging of the latter contact, an arm 133 is urged to engage a further contact 134. Thus the actuation of the cam 129 is adapted for closing two switches, the elements 131, 132 comprising the first switch, indicated at 128a, and the elements 133, 134 comprising the second switch, indicated at 128b.

The switch arm 131 is electrically connected to the positive side of, for example, a 110 volt direct current supply 135, through a lead 136. Energization of the stepping means 93, that is, energization of the motor-magnet 105 will occur when the cam 129 is actuated to close the switch 128a (and 128b) by virtue of the fact that the contact 132, by means of leads 137, 137a, is electrically connected to the aforedescribed contact 110 and hence can intermittently energize the motor-magnet 105 via the arm 107 which will oscillate between the contacts 109 and 110 under the influence of finger 97a. Interposed betwen the leads 137, 137a, is a so-called "off-normal spring switch." 138. The latter is schematically indicated as a double pole switch having contacts 139 and 140, together with a switch arm 141. Contact 139 is connected to the lead 137 and the switch arm 141 to the lead 137a. The other contact 140 of the off-normal spring switch 138 is connected to the lead 136 by means of a lead 142 and hence to the positive side of the direct current voltage source 135. The function of the switch 138 will appear below.

In the operation of the stepping means 93, a closing of the switch 128a will momentarily energize the motor-magnet 105 which will attract the armature 97 thereby thrusting finger 97a downwardly to shift arm 107 out of engagement with contact 110 and into engagement with contact 109, thus temporarily deenergizing such motor-magnet and causing the arm 107 to shift back to the position shown in Fig. 2 thus producing the oscillation of arm 107 which intermittently energizes the motor-magnet 105 and intermittently attracts and releases the armature 97. Each time the armature 97 is attracted, the spring 101 is compressed and the pawl 102 is moved up one tooth and when the motor-magnet 105 is deenergized, the spring 101 acts as a driving spring, urges the armature upwardly, as viewed in this figure, advances the ratchet wheel 110 and arrests same at the advanced position by means of the finger portion 99. Such advancement of the stepping means 93 will persist until the motor-magnet 105 is energized through the switch 128b. The contact 134 of the latter switch, by means of a lead 143, is connected to the base of the arm 107 and the opposite portion of said switch 128b, by means of a lead 144, is connected to a contact 145 of the aforementioned relay 70, the latter having an angularly shiftable armature 146 which is under the influence of a relay coil 147 and is directly connected to lead 136. The latter coil is connected across a balanced rectifier 148 in a manner identical to that of the D. C. center meter 53 (Fig. 1). Consequently during the period that the switch 128, including 128a and 128b, is closed, $e_4$ will be built up to a sum of the output of potentiometer 63 plus $e_6$ and when this sum becomes greater than $e_3$, the coil 147 of relay 70 will force the armature 146 into engagement with contact 145, thereby directing a voltage to the motor-magnet 105 which is not responsive to the position of the interrupter arm 107.

In view of the fact that each of the potentiometers (excepting 66) is stepped or advanced in a manner analogous to potentiometer 63, it is, of course, necessary to "cut out" or disconnect the stepping means 93 and the temporarily connected potentiometer 64. Consequently, the voltage $e_6$ is disconnected from the potentiometer circuit by means of the cam switch 113.

Before the cam control switch 128 is opened by virtue of the continued motion of the cam 129, it is, of course, necessary to provide suitable holding means to insure the continued energization of the motor-magnet 105 whereby the wiper 63b will remain at its correct position, for example, step 6, until "homed" to the zero tap. Such holding means are constituted in the form shown, by a self-locking relay indicated generally at 149 which is under the influence of a cam controlled switch 149a, the latter being under the influence of a cam 150. A coil 151 of the relay 149 is connected at one extremity thereof to the positive side of the D. C. voltage source, that is, to the lead 136 by means of leads 152, 153 and 154. In the latter lead is interposed a so-called reset switch 155 which, as will appear more fully hereinafter, is normally closed but which can be momentarily opened to deenergize coil 151 and to effect a homing of all of the stepping switches. The opposite extremity of the coil 151 is connected to ground at 156 through the aforementioned switch 149a, the latter being interposed in a lead 157. Thus a closing of the switch 149a will energize the coil 151 and close two relay switches 158 and 159. The former constitutes a locking switch and maintains the energized conditions of the coil 151 after the opening of the switch 149a, the latter switch being closed only for a very short interval. The closing of the switch 159 directs a positive D. C. voltage to the coil 105 via the contact 109, the arm 107 and lead 108, said switch 159 being interposed in lead 160 which is connected to the aforementioned lead 153. Consequently the momentary closing of the switch 149a will direct a continuous voltage to the motor-magnet 105 to hold same regardless of the opening of the switches 113 and 128. That is, the motor-magnet 105 of the stepping means 93 will be energized until the reset switch 155 is opened.

The aforedescribed off-normal switch 138 is operatively connected to the stepping means to shift arm 141 thereof from the position shown in Fig. 2 wherein it engages the upper contact 139 to the position where it engages the lower contact 140. Such operative interconnection is not shown but can comprise, for example, a cam which is angularly shiftable with the wiper 63b by means of the stepping means 93, such cam shifting the off-normal arm 141 into engagement with the contact 140 when a wiper is positioned on or between the taps Nos. 1–10, inclusive. Hence during the oscillation of the interrupter arm 107 the electrical energy for the motor-magnet 105 is derived directly from the lead 136 and not through the switch 128a. However, when $e_4$ becomes greater than $e_3$ and the motor relay 70 causes engagement of the armature 146 and the contact 145, the interrupter arm 107 then is pulled away from the contact 110 and the position of the off-normal spring arm 141 is temporarily of no significance in the control of the motor-magnet. However, when the reset switch 155 is momentarily opened, the voltage is removed from contact 109 due to opening of switch 159 and thereafter the interrupter spring or arm 107 will oscillate (by virtue of arm 141 engaging contact 140) until arm 141 is urged away from contact 140 and into engagement with contact 139 by means of said cam, which occurs when the wiper arm has advanced to the zero or home position shown, and the next successive wiper arm (120° removed therefrom) will be positioned near to but spaced from the No. 1 tap and thus in position for the next stepping action.

From the above it will be seen that, with respect to the stepped potentiometer 63, the automatic actuation means is constituted by:

(a) The stepping means 93;
(b) A group of cam controlled switches for such stepping means comprising: (1) switch 128 under the influence of cam 129; and (2) switch 149a under the influence of cam 150.

The stepping means 93, in addition to being under the influence of said cam controlled switches 128 and 149a, is under the influence of the aforedescribed cam controlled switch 113 in that the latter is effective, during the stepping or advancing of the wiper 63b, to supply voltage $e_6$ to the voltage output of potentiometer 63 whereby the wiper 63b is caused to stop at a tap, the voltage of which is next to and immediately below the voltage $e_3$.

The cams of the switches 113, 128 and 149a are actuated for each weighing by causing them to shift angularly through one revolution. This is accomplished by means of a motor 161 connected to a 110 volt 60 cycle A. C. energy source, as at 162, by means of leads 163 and 164. Interposed in the lead 164 is a cam controlled switch 165 which is under the influence of a cam 166. The latter is formed with a valley, as at 167, into which a cam follower 168 may ride at which time said switch 165 is opened. Movement of the follower 168 out of the valley and onto the periphery of the circular cam 166 will, of course, close the switch 165 thereby to energize the motor until cam 166 has moved through 360°. Connected and parallel to the cam controlled switch 165 is a manually controlled (normally open) starting switch, as at 169, which can be momentarily closed to start the motor 161. The cams 114, 129, 150 and 166 are operatively connected to the motor 161.

The stepped potentiometer 64 as aforementioned is provided with stepping means 94 which are similar to stepping means 93. The stepping means 94 in turn are under the influence of cam controlled switches generally indicated at 170 and 171 which are analogous to the switches 128 and 149a, respectively, and are analogously connected in the circuit of the apparatus. Said cam controlled switches 170 and 171 are provided with cams 172 and 173, respectively.

The cam controlled switch 125 also is provided for influencing the stepping of the wiper 64b for supplying into the circuit of the potentiometers during the actuation of wiper 64b voltage $e_7$, namely, the full value of the voltage of potentiometer 65, such supply of voltage $e_7$ being for a purpose similar to that heretofore explained with respect to $e_6$.

A self-locking relay 174 and off-normal switch 175 are provided for the stepping means 94 which are analogous to relay 149 and off-normal switch 138, respectively.

For the potentiometer 65 and its stepping means 95 there are provided cam controlled switch means 176 and 177 having cams 178 and 179, respectively, said cam controlled switch means, of course, being analogous to 128 and 149a. A self-locking holding relay 180 and the off-normal switch 181 are also provided which in turn are analogous to relay 149 and switch 138 aforementioned.

During the stepping of wiper 65b it is, of course, desired, for reasons aforementioned, to supply the potentiometer circuit with the full value of voltage $e_8$ and this is accomplished by means of the cam controlled switch generally indicated at 182 under the influence of cam 183. An arm 184 of said switch is connected to the above-described lead 182 from the attenuator 78, 79 and said arm 184 normally engages a contact 185 of said switch, the other contact 186 being connected to the No. 10 tap of the potentiometer 66 by means of a lead 187.

The advancing of the stepping of the wiper 66b of the potentiometer 66 is controlled by the stepping means 96 under the influence of cam controlled switches 188 and 189, respectively analogous to the aforedescribed switches 128 and 149a, said switches 188 and 189 having control cams 190 and 191, respectively. A self-locking holding relay 192 is also connected in the circuit of the stepping means 96 and is analogous in construction and operation to the aforementioned holding relays 149, 174 and 180.

It will be observed that, due to the low order of the increment of the potentiometer 66, it is not necessary to supply the potentiometer circuit with an arbitrary or constant voltage during the stepping of the wiper 66b.

There is shown in Fig. 4 one example of the means for operatively interconnecting the stepping means 93–96, inclusive, with the weight indicating dials 71–74, inclusive, respectively, and also to a group of type wheels having numerals, for example, embossed upon their peripheries in order to permit printing of the weight upon a tape. Such group of type wheels is generally indicated at 193 and comprises type wheels 194, 195, 196 and 197 which are respectively movable with the dials 71–74, inclusive.

The stepping means 93 are schematically indicated in Fig. 4 and are provided with the following operative interconnection to the dial 71 and type wheel 194: A toothed gear 198 is connected to the stepping means 93 which meshes with a gear 199 secured to one extremity of the shaft 200, the opposite extremity thereof having a gear 201 which meshes with gears 202 and 203, respectively secured to the dial 71 and type wheel 194.

The stepping means 94 is provided with an analogous operative interconnection comprising gears 204 and 205, the latter being secured to a sleeve shaft 206 which embraces and is concentric with the shaft 200. Secured to the opposite extremity of sleeve shaft 206 is a gear 207 which engages gears 208 and 209 respectively secured to the dial 72 and the type wheel 195. The operative interconnections between the stepping means 95 and 96 are analogous to those just described.

In the operation of the embodiment of Fig. 2, a weight is placed upon the weighing cell means 62 which creates an output voltage $e_3$. The latter voltage is supplied to one side of the input coil 90 of the amplifier 87. At this point, of course, the potentiometer output $e_4$ is zero due to the fact that all of the wipers 63b–66b, inclusive, are adjusted to their zero or home positions. The starting switch 169 is thereupon momentarily closed thereby angularly shifting the cam 166 long enough to close the switch 165 and to cause the motor 161 to commence its rotation for a time sufficient to move cam 166 and the other cams operatively connected thereto (Fig. 3) through one revolution. So long as $e_3$ is greater than $e_4$, the switch (145, 146) of relay 70 will be open. However, when $e_4$ becomes greater than $e_3$ by virtue of the stepping of, for example, the wiper 63b, such switch of the relay will close as will now appear. Each of the stepping means 93–96, inclusive, is actuated in sequence one at a time thereby to step each of the wipers 63b–66b, inclusive, one at a time and sequentially (in the descending order of their increments) until $e_4$ is built up to a point equal to $e_3$ at which time the position of the wipers, together with the indicia means (71, 72, 73 and 74) connected thereto, indicates the weight applied to the weighing cell means 62. The order of the actuation of the aforedescribed cams and switches is indicated in Fig. 3 which provides also a graphical indication of the duration of the closing of such switches and also an indication of the time of actuation of each of the motor-magnets (105, 94a, 95a and 96a). With respect to the actuation of potentiometer 63, the following occurs.

(1) The arm 116 of the switch 113 is shifted by cam 114 from the position shown in Fig. 2 to the right into engagement with contact 118, such engagement enduring from .1 to .7 second or a total of .6 second as shown in Fig. 3. The effect of this is to apply to the potentiometer circuit, prior to the stepping of the wiper 63b, the full voltage $e_6$ of potentiometer 64. Such voltage, as aforementioned, amounts to 1,000 volts and represents 1,000 pounds. The circuit in which said voltage $e_6$ alone is applied between .1 and .7 second is as follows, measuring from the ground at 80: resistance 79, lead 82, switch 182, lead 183, wiper arm 66b positioned upon its zero tap, leads 210, 211, 212, wiper arm 65b, lead 124, switch arm 122, lead 121, switch arm 116, lead 120, resistance 64a, lead 213, lead 214, wiper arm 63b and lead 92, the latter being connected to the input coil 90 of the amplifier 87.

(2) Shortly thereafter, commencing at .2 second and enduring until .7 second, the cam 129 closes the switch 128, including the two subswitches 128a and 128b. The closing of the former subswitch 128a has the effect immediately of actuating the stepping means 93, a direct current voltage being applied thereto through the following circuit: lead 136, switch arm 131, contact 132, lead 137, contact 139, lead 137a, contact 110, interrupter arm 107, lead 108 and to ground at 106. The contact 109 opposite to 110 at this point is not energized because the holding relay 149 is not yet actuated. Consequently the interrupter arm 109 will oscillate between contacts 107 and 110 by virtue of the oscillation of armature 97 thereby intermittently to energize the motor-magnet 105 and to advance the ratchet wheel 100 and hence to step the wiper 63b. One of the arms 63c of the wiper 63b is initially in engagement with the zero tap which is positioned next adjacent the No. 10 tap, such relative position being for assisting in the homing of the wiper as will appear hereinafter. A next adjacent wiper arm 63d at the outset is positioned near to but spaced from the No. 1 tap. The actuation of the stepping means 93 will force wiper 63b in a counterclockwise direction thereby moving arm 63c off of the zero tap, and moving arm 63d counterclockwise successively into engagement with the taps of increasingly higher value. In this instance, since the aforementioned weight of 6474 pounds is placed upon the weighing cell means 62, the arm 63d will advance under the action of the stepping means 93 until it reaches tap No. 6, it being remembered that the voltage $e_6$ supplied from the potentiometer 64 next lower in order is supplied into the potentiometer circuit as aforedescribed. Thus when arm 63d has reached tap No. 6, the aggregate voltage $e_4$ will be 7,000 volts. The circuit in which said 7,000 volts is built up is exactly similar to that above traced with respect to voltage $e_6$ except that a pertinent portion of resistance 63a is included in the new circuit. When the wiper arm 63d has reached tap No. 6 and $e_4$ aggregates 7,000 volts, the latter voltage being greater than $e_3$, the relay 70 will immediately sense this relationship, cause armature 146 to engage contact 145 thereby immediately stopping the oscillation of the armature 97 and the interrupter arm 107 of the stepping means 93 and for the time being continuously energizing the motor-magnet 105. This is accomplished because the D. C. voltage from source 135 is applied directly to the motor-magnet 105 in effect bypassing the arm 107 through the following circuit: lead 136, armature 146, contact 145, lead 144, switch arm 133, contact 134, lead 143 and lead 108.

(3) It is seen that the cams 114 and 129 will, under the influence of motor 161, continue to shift angularly and at .7 second will open the respective switches thereof as aforementioned in order to provide for the homing of each arm of the wiper to the zero contact. The off-normal switch arm 141 of switch 138 is shifted from its normal position in engagement with contact 139 into engagement with contact 140 by suitable cam means (not shown) whenever a wiper arm is positioned upon or between taps 1—10. Thus when a wiper arm is so positioned, the contact 110 adjacent the interrupter arm 107 will be energized by virtue of the following: lead 142, contact 140 and lead 137a. Thus the opening of the switch 128 will result in a reenergization of the stepping means 93 unless some means are provided to prevent it. The above-described holding relay device 149 comprises such means and has the effect of holding the interrupter arm 107 out of engagement with the contact 110 by virtue of the energization of the motor-magnet 105 until the reset or homing switch 155 is opened. The holding relay device 149 is actuated by the cam 150 preferably for a short time interval, for example, .1 second, as is shown in Fig. 3. That is, cam 150 closes the switch 149a and energizes the coil 151 of the holding relay 149 thereby closing the switches 158 and 159. The closing of the former provides for continued energization of coil 151 after the opening of the switch 149a. The closing of switch 159 provides for the supplying of the positive D. C. voltage to the contact 109 and hence to the coil 105, such supply of D. C. voltage being effected through the following circuit: leads 136, 154, 153, switch 159, lead 160, contact 109, switch arm 107 and lead 108. Thus when the subswitch 128b is opened at .7 second, the motor-magnet 105 will remain energized and the wiper arm 63d will remain upon the tap No. 6.

Following the opening of the switches 113 and 128, the cams 125a and 172 actuate respectively the switches 125 and 170 thereby supplying voltage $e_7$ into the potentiometer circuit commencing slightly in advance of and during the stepping of the wiper 64b in a manner similar to that above described. The stepping means 94 and its motor-magnet 94a are similarly actuated and arrested and the holding relay device 174 under the influence of the cam 173 and the switch 171 effect a holding of the wiper arm 64d upon tap No. 4. The next successive potentiometers are actuated similarly with the exception of potentiometer 66 with respect to which it is unnecessary to supply a constant added voltage during an actuation thereof. The potentiometers 65 and 66 thus are advanced respectively to taps Nos. 7 and 4 thereby correspondingly moving their indicia means 73 and 74.

It has been mentioned above that, with respect to the last potentiometer 66, the increment between taps 1 and 2 is .5 volt and between taps 9 and 10 is 1.5 volts. The reason for this is to insure that the wiper 66b will find its position upon the proper tap to an accuracy of plus or minus .5 pound. Assume, for example, that the weight upon the weighing cell means is 6474.5 pounds. Thus the indication by the indicia means (in the absence of such increments at the opposite extremities of potentiometer 66) could be either 6474 or 6475. If the weight is slightly above 6474.5, it is desired to indicate 6475 and if slightly below 6474.5 it is desired to indicate 6474. The establishment of the increment of .5 volt between taps 1 and 2 will accomplish the above purpose.

It will be noted above that the resistances 63a, 64a, 65a and 66a are, by way of example, respectively 9,000 volts, 1,000 volts, 100 volts and 10 volts, thus aggregating 10,110 volts. Such aggregate, of course, can be any desired amount, for example, an even 10,000 volts, the latter total being achieved by tapping resistance 64a (total $e_6$) to produce 900 volts in 9 steps of 100 units each; and tapping resistance 65a (total $e_7$) to produce 90 volts in 9 steps of 10 units each.

It is desired for this weighing device to be capable of weighing with an error no greater than ± .5 pound with a maximum capacity of 10,000 pounds, that is, it is desired for this scale to be capable of weighing to an accuracy of five parts in 100,000. In order to achieve this accuracy at certain critical weights, I have found it desirable, as in the embodiment of Fig. 2, to impress upon the potentiometers 63, 64 and 65 during the actuation or stepping thereof a voltage which is ½ volt less than the maximum value of the potentiometer or incremental means next lower in order of succession. This can be illustrated by the following: Assume that the scale has a maximum capacity of, for example, 10,000 pounds and can indicate 4 digits from 0000 to 9999. Also assume that the actual weight upon the strain gauge means is between 4999.5 and 5000.5 say 4999.8 pounds. In order to achieve the aforementioned accuracy, the indicia 71–74 should indicate a weight of 5,000. Since the stepping switches select these digits in the order of thousands, hundreds, tens and units, the thousand digit is the first one selected. Thus it is critical at the outset whether or not a 4 or 5 is selected for the aforementioned weight of 5,000 pounds ±.5 pound. If the actual weight is 4999±.5 pounds, a 4 should be selected and if 5000±.5 pounds a 5 should be selected. The same condition exists with respect to the selection of a 9 or a zero for the hundreds digit and also the tens and unit digits. The proper selection of the digit can be effected as aforementioned by impressing upon potentiometer 63 a voltage of 999.5 instead of 1,000 during the stepping of such potentiometer; 99.5 volts instead of 100 upon potentiometer 64 during the actuation thereof; and 9.5 volts instead of 10 upon potentiometer 65 during its actuation. It is, of course, not necessary to impress upon a given incremental means during the actuation thereof the actual voltage of the next lower incremental means. Electrical energy which is equivalent to that of the next lower incremental means may be so impressed. Furthermore, other preselected percentages of the electrical energy of the next lower incremental means, or the equivalent of such energy, and less than the full amount thereof can be impressed upon a given incremental means during the actuation thereof.

Although only one embodiment of the present invention has been illustrated and described in detail, it is to be understood that the invention is not limited thereto. The term "electrical parameter" as employed herein includes, for example, impedance or any combination of its components.

Various changes may be made in the design and arrangement of the parts without departing from the spirit and scope of the invention as the same may now be understood by those skilled in the art. For a definition of the limits of the invention, reference will be had primarily to the appended claims.

What is claimed is:

1. In apparatus of the class described, means including an electro-responsive element for controlling electrical energy in response to physical change in such element; a plurality of stepped incremental means each being so constructed and arranged for varying electrical energy by a preselected increment in response to the movement of a movable member comprising a part thereof; means for automatically moving said movable members in sequence, the increment of each incremental means being of a higher order than that of the incremental means next lower in order of succession; a like plurality of indicia means, each connected to the movable member of a corresponding incremental means for movement in response to the movement thereof; comparator means for sensing the relationship between the energy output of said first-mentioned means and the joint energy output of said incremental means; means for supplying to said comparator means during the movement of the movable member of the first actuated of said incremental means, and of such means sequentially actuated thereafter, electrical energy corresponding in amount to a preselected percentage of but not greater than the maximum value of energy controllable by the next succeeding incremental means; and means for arresting the movement of the movable member of the incremental means undergoing actuation in response to the sum of such supplied electrical energy plus the energy of the actuated incremental means reaching a value greater than the energy of said first-mentioned means.

2. In apparatus of the class described, means including an electro-responsive element for controlling electrical energy in response to a physical change in such element; a pair of stepped incremental means each being so constructed and arranged for varying electrical energy by a preselected increment in response to the movement of a movable member comprising a part thereof; means for automatically moving said movable members in sequence each from a selected norm position, the increment of one of such incremental means being of a higher order than that of the other; indicia means connected to said movable members for providing indications responsive to the movement thereof; comparator means for sensing the relationship between the energy output of said first-mentioned means and the joint energy output of said incremental means; means for supplying to said comparator means during the movement of the movable member of the first actuated of said incremental means electrical energy corresponding in amount to a preselected percentage of but not greater than the maximum value of energy controlled by one step of such incremental means; and means for arresting the movement of the movable member of the incremental means undergoing actuation in response to the sum of such supplied electrical energy plus the energy of the actuated incremental means reaching a value greater than the energy of said first-mentioned means.

3. In apparatus of the class described, means including an electro-responsive element for controlling an electrical parameter in response to physical change in such element; a plurality of stepped incremental means, each being constructed and arranged for varying electrical energy by a preselected increment in response to the movement of a movable member comprising a part thereof; said plurality of incremental means being arranged in succession, the increment of any one of such means being of a different order as compared to that of the next successive of such incremental means; means for automatically moving said movable members in preselected sequence; means for comparing the electrical output of said parameter controlling means with the joint energy output of said incremental means; electrically powered means for controlling the degree of advancement of such movable members in accordance with the attainment of a preselected relationship between said outputs as sensed by said comparing means; and means for supplying to said comparing means during the actuation of each of said incremental means, except that lowest in sequence of actuation, electrical energy corresponding in amount to a preselected percentage of but not greater than the maximum value of energy controllable by the next succeeding incremental means.

4. In apparatus of the class described, means, including an electro-responsive element, for controlling an electrical parameter in response to a physical change in such element; a pair of stepped incremental means for varying electrical energy, each by a different increment, each of such incremental means having a member which is movable for making such variation; means for comparing the energy output of said electrical parameter control means with the energy output of said incremental means; a device for actuating said movable members in sequence commencing with the means having the highest increment; means for supplying to said comparing means, during the movement of the first moved of such movable members, electrical energy corresponding in amount to a preselected percentage of but not greater than the maximum amount of energy controllable by the other incremental means; and means for arresting the movement of such first moved movable member in response to the sum of such supplied electrical energy plus the energy of the first actuated incremental means reaching a value having a preselected relationship with the energy of the first-mentioned means.

5. In a weighing device, means for controlling a voltage in accordance with the weight of an object and comprising an element whose electrical characteristics may be varied by a physical force applied to said element resulting from such weight thereby to control such voltage, and means for connecting said element to a source of electrical energy; reference means for producing a voltage having predetermined variable levels comprising a plurality of stepped potentiometers, indicia means associated with each of said potentiometers, and means for connecting said potentiometers to a source of electrical energy; automatically operable electrical means for actuating said potentiometers one at a time and in preselected sequence thereby to advance same in voltage output; means connected to said first-mentioned means and said reference means for sensing the relative values of the voltages produced by said first-mentioned means and said reference means; and means for controlling such actuating means for arresting each of said potentiometers at a step, the voltage of which is next to and immediately below the voltage of said first-mentioned means.

6. In apparatus of the class described, means including an electro-responsive element for controlling electrical energy in response to a physical change in said element; a plurality of variable potentiometers arranged in succession, each potentiometer having a shiftable arm with a plurality of separate taps, the increment of each potentiometer being of a higher order than that of the next lower successive one; a like plurality of indicia means operatively connected to respective of said potentiometers for movement in response to the relative movement between the respective potentiometer arms and taps; an amplifier having an input and an output; means for connecting said potentiometers in series with one another and to said input of said amplifier; means for connecting said electro-responsive element to said input; means for sensing the relationship between such inputs as amplified by such amplifier; electrically actuated means for advancing the arms of said potentiometers relative to the contacts thereof individually and in preselected sequence; electrically actuated means for arresting such advance of each such arm in response to said potentiometer output becoming greater than that of said first-mentioned means; electrically actuated means for impressing for a preselected time interval upon each potentiometer except the last thereof in succession and during such advance a voltage corresponding to a predetermined percentage of the full voltage of the next successive potentiometer, and means operable prior to the actuation of such next successive potentiometer for automatically removing said voltage from the preceding potentiometer.

7. In apparatus of the class described, means including an electro-responsive element for controlling an electrical parameter in response to a physical change in said element; a plurality of variable potentiometers, each potentiometer having a shiftable arm with a plurality of separate taps; a like plurality of indicia means operatively connected to respective of said potentiometers for movement in response to the relative movement between the respective potentiometer arms and taps; an amplifier having an input and an output; means for connecting said potentiometers in series with one another and to said input of said amplifier; means for connecting said electro-responsive element to said input; phase and amplitude detecting and indicating means connected to said output of said amplifier; electrically actuated means for advancing the arms of said potentiometers relative to the contacts thereof individually and in preselected sequence; electrically actuated means for arresting such advance of each such arm in response to said potentiometer output becoming greater than that of said electro-responsive element; an electrically actuated means for impressing for a preselected time interval upon each potentiometer during such advance a voltage corresponding to the full voltage of the next successive potentiometer, and means operable prior to the actuation of such next successive potentiometer for automatically removing said full voltage from the preceding potentiometer.

8. In apparatus of the class described, a source of alternating electrical energy having a plurality of outputs, a bridge network connected to one of said outputs, said network including in an arm thereof an impedance whose value is determined by the physical force applied thereto, a first plurality of manually variable potentiometers connected to another of said outputs and connected in series with each other, a second plurality of manually variable potentiometers connected to a further one of said outputs and connected in series with each other, each of said potentiometers having indicia means operatively connected therewith, an amplifier having an input and an output, means connecting said first plurality of potentiometers in series with said second plurality of potentiometers and to said input of said amplifier, means connecting said bridge network to said input, said network being connected to said input in phase opposition with respect to said potentiometers, and phase and amplitude detecting and indicating means connected to said output of said amplifier for detecting and indicating the energy output of said amplifier.

9. In apparatus of the class described, a source of alternating electrical energy having a plurality of outputs, a bridge network connected to one of said outputs, said network including in one arm thereof an impedance whose value is determined by the physical force applied thereto, a plurality of manually variable potentiometers connected to another of said outputs and connected in series with each other, an amplifier having an input and an output, means connecting said plurality of potentiometers to said input of said amplifier, means connecting said bridge network to said input, said network being connected to said input in phase opposition with respect to said potentiometers, and phase and amplitude detecting and indicating means connected to said output of said amplifier for detecting and indicating the energy output of said amplifier.

10. In apparatus of the class described, means including an electro-responsive element for controlling electrical energy in response to a physical change in such element, a primary and a secondary stepped incremental means, each having a movable member for varying electrical energy in steps according to its respective increment, such variation of energy being effected in accordance with the degree of advancement of each movable member from its norm position; means for sequentially moving such movable members thereby to actuate said incremental means in sequence, the increment of the primary of such incremental means being of higher order than that of the other incremental means; comparator means for sensing the relative amounts of the energy output of said first-mentioned means and the sum of the energy outputs of said incremental means; means for supplying to said comparator means temporarily during the actuation of the primary incremental means electrical energy corresponding in amount substantially to the maximum value of the energy output of which the other of such incremental means is capable; and means operatively connected to said comparator means for arresting the advancement of the movable member of said primary incremental means in response to the attainment of a preselected relationship between the energy output of said first-mentioned means with the sum of such temporarily supplied energy output and the energy output of said primary incremental means.

11. Apparatus in accordance with claim 10 including means also operatively connected to said comparator means for arresting the advancement of the movable member of said secondary incremental means in response to the sum of the energy output of said primary and secondary incremental means attaining a preselected relationship with the energy output of such first-mentioned means.

12. In apparatus of the class described, means including an electro-responsive element for controlling electrical energy in response to a physical change of such element; a plurality of stepped incremental means each having a movable member and each constructed and arranged for varying electrical energy by a preselected increment in response to the movement of its movable member; means for moving said movable members in sequence in the order of the value of the energy increment controlled thereby commencing with the largest increment; comparator means for sensing the relationship between the energy output of such first-mentioned means and that of said incremental means; means for supplying to said comparator means and during the movement of each movable member, except the last in such sequence, electrical energy in an amount substantially equal to the energy corresponding to one incremental step of the particular incremental means the movable member of which is undergoing advancement; and means operatively connected to said comparator means for controlling the degree of advancement of each of said movable members in response to the attainment, as sensed by said comparator means, of a preselected relationship between the energy output of said first-mentioned means and the energy output of said incremental means and such supplied energy.

13. In apparatus of the class described, means including an electro-responsive element for controlling electrical energy in response to a physical change in such element; a plurality of stepped incremental means each having a movable member for varying electrical energy in a preselected increment in response to the degree of advancement thereof from a norm position; means for moving said members in sequence; comparator means for sensing the relationship between the energy output of said first-mentioned means and said incremental means; means for supplying in such sequence to such comparator means energy in an amount equal to the energy corresponding to one incremental step of the particular incremental means the movable member of which is undergoing movement; and means operatively connecting said comparator means and moving means for sequentially arresting the movement of each of said movable members in response to said comparator means sensing a preselected relationship between the energy output of said first-mentioned means and that of said incremental means as modified by said energy corresponding to such one incremental step of the particular incremental means undergoing actuation.

References Cited in the file of this patent

UNITED STATES PATENTS

| | | |
|---|---|---|
| 2,488,349 | Thurston | Nov. 15, 1949 |
| 2,547,750 | Hall | Apr. 3, 1951 |
| 2,598,812 | Marco | June 3, 1952 |
| 2,602,660 | Shannon | July 8, 1952 |
| 2,610,052 | Macgeorge | Sept. 9, 1952 |
| 2,623,741 | Broekhuysen | Dec. 30, 1952 |
| 2,631,027 | Payne | Mar. 10, 1953 |